(No Model.)
T. TENNENT.
ARTIFICIAL HORIZON.
No. 269,486. Patented Dec. 19, 1882.
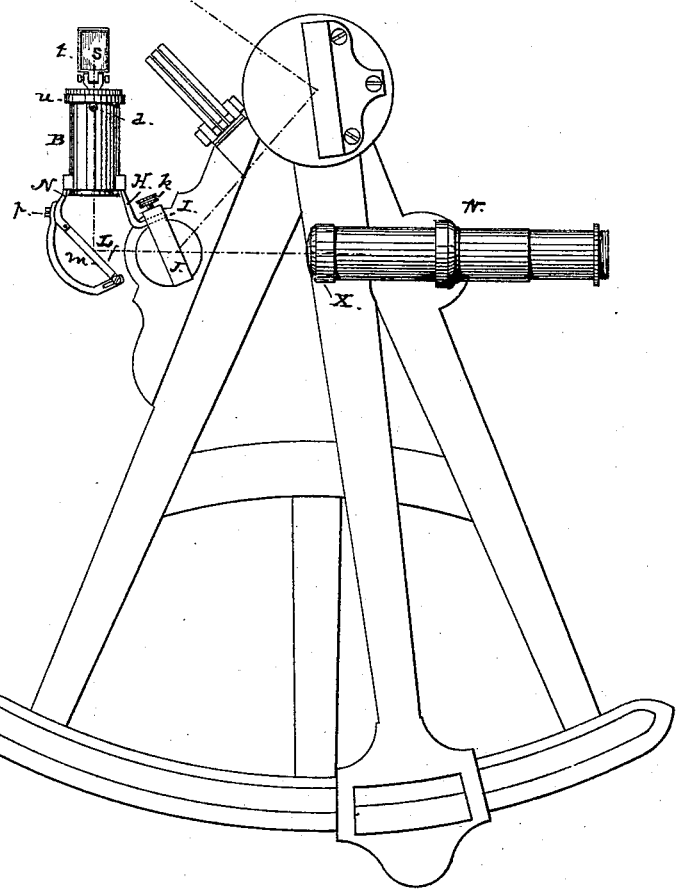
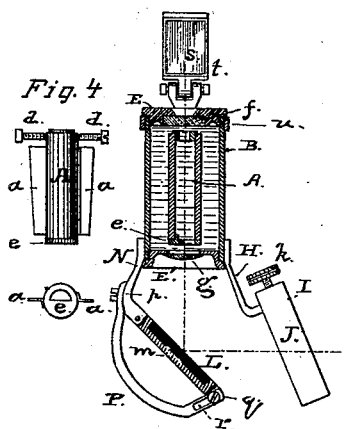
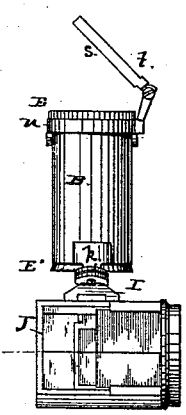
Witnesses:
Inventor:
Thomas Tennent
By his Atty,

UNITED STATES PATENT OFFICE.

THOMAS TENNENT, OF SAN FRANCISCO, CALIFORNIA.

ARTIFICIAL HORIZON.

SPECIFICATION forming part of Letters Patent No. 269,486, dated December 19, 1882.

Application filed June 28, 1882. (No model.)

*To all whom it may concern:*

Be it known that I, THOMAS TENNENT, residing in the city and county of San Francisco, and State of California, have made and invented certain new and useful improvements in instruments for ascertaining the horizon, which are technically termed "Artificial Horizons;" and I do hereby declare that the following is a full, clear, and exact description of the same, reference being had to the accompanying drawings.

My invention relates to a means of determining the true horizon in sextants, octants, and like instruments when taking observations under conditions where the natural horizon or any fixed distant object is not available.

It consists in suspending a pendulum within an inclosing-case to protect it from outside disturbances and then attaching the case to the frame of the instrument in front of the eye-piece in such relation to a reflector that the true vertical position of the instrument is indicated to the observer by the reflected image of the end of the pendulum. The reflector is so adjusted with respect to the line of sight through the instrument and the position of the pendulum that when brought to the true vertical a reflected image of the end of the pendulum shall coincide with the line of sight and be visible to the observer at the eye-piece.

It consists, also, in suspending the pendulum within a sealed tube or case containing a suitable non-congealable liquid, by which the natural vibrations of the pendulum produced by motions of the vessel or from the unsteadiness of the operator are counteracted or modified, and a more definite image of the pendulum is given in the reflector.

The following description explains the nature of my said inventions and the manner of constructing, applying, and operating or using the same.

In the drawings hereinafter referred to, Figure 1 is a side elevation of the apparatus properly mounted. Fig. 2 is an elevation of the pendulum-case and attached parts, taken at right angles from that in Fig. 1, looking from the right. Fig. 3 is a central vertical section of the same, taken at right angles to Fig. 2. Fig. 4 represents the pendulum detached in side elevation and inverted plan. Fig. 5 is an end view of the telescope.

The pendulum A is suspended within a case, B, of circular or other suitable shape, and from the pointed ends of two screws, $d\ d$, that pass through the outside of the case at the upper end and take in small holes on opposite sides of the pendulum, so as to give it a free motion from such points of suspension.

In constructing the case B, I prefer to make it of a short section of metal tube, and to close it at both ends by means of screw-caps E E', so that the pendulum is thus entirely isolated and incased. The top end piece or cap, E, is perforated by a central opening fitted with a plain flat glass, $f$, burnished into the cap, so as to be water-tight, while the lower cap, E', holds a plano-convex lens, $g$.

The pendulum A is hollow, so that the rays of light entering through the opening in the top case may pass through the pendulum and out through the bottom lens. The pendulum is held in the line of these openings, so that the center-line or axis of its aperture shall coincide with the center of the openings when occupying a true vertical position.

To attach the pendulum-tube to an instrument, I employ a brace, H, having one end secured to the side of the tube at the lower end and its free end inserted through a loop, I, on the top of the horizon-frame J, and held therein by a milled-head screw, $k$.

Beneath the lower end of the pendulum-case a mirror, L, of black or colored glass, mounted in a frame, $m$, is attached by a hinge-joint to the brace N, which is secured to the lower part of the case B. From this brace a curved arm, P, fixed at $p$, extends downward and forward in position to support the lower end of the mirror-frame $m$. At this point the attachment is made by means of a screw, $q$, working through a slot, $r$, in the end of this arm P and taking into the mirror-frame. This means affords an accurate adjustment of the mirror to an angle of forty-five degrees with the face of the lower end of the case B.

A reflector mounted over the top of the pendulum-case is employed to reflect artificial lights, as from a lantern or otherwise, from the side down into the case. This attachment is used for observations at night, and it consists simply of a mirror or reflecting-surface, S, mounted in a casing, $t$, and attached by a hinge-joint to a light ring, $w$, which encircles while it is free to revolve around the upper portion of the tubular case B.

When required to be used this artificial horizen is attached to the loop on top of the horizon-frame in upright position, and secured by the screw k. The upper reflector, S, is thrown back, and the rays of light then coming down through the glass in the upper cap and through the hollow pendulum the lens c produces a magnified image of the end of the pendulum in the inclined mirror beneath the case, which image is thence reflected at right angles through the unsilvered portion of the horizon glass to the eye of the observer. In order to define the central point of the aperture through the pendulum a diaphragm, e, presenting an edge extending diametrically across the aperture, is inserted and secured in place in the end of the tube at this point, and the reflected image of this edge being made to coincide either with a line drawn across the face of the mirror or with a horizontal line on the horizon-glass the true position of the instrument is determined. At such time of operation the image of the sun is brought down in the usual way to cut the same horizontal line on the reflecting portion of the horizon-glass. When it is required to find the altitude of a star at night the upper reflector is placed at such an angle as to reflect artificial light from a lantern at the side down through the case.

The telescope W is of the kind usually employed in sextants or octants to give a better defined image of the sun or a star than with the unaided sight, excepting that upon the forward end is placed a cap, X, containing a bisected or half lens, y, of a focal distance equal to the distance between the object end of the telescope and a point in the center of the mirror. When the telescope is used this cap is placed in such position that the half-lens is opposite the unsilvered portion of the horizon-glass, while the reflected object is seen unobstructed through the open space of the cap. By such means the image of the sun in the glass and the image of the diaphragm e in the reflector can be distinctly seen at the same time.

In order to overcome the vibrations of the pendulum, due to the unsteadiness of the hand or the motion of the vessel, I fill the pendulum-case with some suitable transparent fluid, confined within it by means of the two caps E E'. Alcohol, glycerine, or any other sufficiently transparent fluid that will not congeal can be employed for this purpose. The effect of the fluid upon the pendulum can be greatly increased by fixing to the outer sides of the pendulum two thin metallic flanges or wings, a a, which extend from end to end and in line with the points of suspension, but out of contact with the inner surface of the case. This construction permits a free swinging movement of the pendulum, but checks its tendency to vibrate while the instrument is in the hand.

I do not claim as my invention the use of a pendulum to determine the position of a sextant, octant, or other instrument; but I claim the use of a pendulum inclosed within a case or tube by which the disturbing effects of the wind and air current are removed and the movements of the pendulum are produced by force of gravity alone, and I also claim immersing such an inclosed pendulum in a transparent fluid to prevent vibrations, due to the unsteadiness of the instrument.

Having thus fully described my invention, what I claim, and desire to secure by Letters Patent, is—

1. The improved horizon attachment for sextants, octants, or quadrants, consisting of the pendulum suspended in vertical position and free to swing with an inclosing-case, having apertures in top and bottom for the transmission of light through the case, the reflector L, mounted beneath the end of the case and in line with the aperture, and at an angle of forty-five degrees with the face thereof, and a means for attaching said case in vertical position to the frame of the instrument in front of the eye-piece in position as described.

2. In a sextant, octant, or quadrant, the combination of a suspended pendulum inclosed within a case having openings for the transmission of light, an inclined reflector, L, arranged with relation to the opening and the line of sight on the instrument, whereby the reflected image of the end of the pendulum is visible to the observer through the eye-piece and the position of the pendulum is determined therefrom.

3. The case having openings E E', and adapted to hold a body of liquid, and the suspended pendulum held from point of suspension in line with the openings, and the brace for securing said frame to the frame of an instrument.

4. The combination, with the case B, having openings E E', and containing a suspended pendulum, A, in line with said openings, of the inclined reflector L, arranged in relation to the opening substantially as described.

5. The combination, with the case having openings and containing a transparent liquid, of the suspended pendulum having the flanges a a, substantially as described, for the purpose set forth.

6. The combination, with the case having openings and containing the suspended pendulum, of the upper reflector, S, movable and adjustable, as described.

7. In a sextant, octant, or quadrant, the combination of the inclosed suspended pendulum, the inclined reflector in line with the sight of the instrument, the horizon-glass, and a telescope having a half-lens secured over a portion of its object-glass, whereby a reflection image of the pendulum can be seen through one portion of the object-glass, and the reflection of the sun or a star in the horizon-glass can be seen through the other portion of the object-glass of the same telescope.

Witness my hand and seal.

THOMAS TENNENT. [L. S.]

In presence of—
EDWARD OSBORN,
D. SELLECK.